Jan. 26, 1971   R. L. WOLFE ET AL   3,557,423
METHOD FOR MANUFACTURING AN IMPROVED COMPOSITE GEAR
Filed Aug. 28, 1968

INVENTORS
ROBERT L. WOLFE
AUGUSTINE TREBNIK
BY
Hood, Gust, Irish & Lundy
ATTORNEYS 3,557,423
METHOD FOR MANUFACTURING AN
IMPROVED COMPOSITE GEAR
Robert L. Wolfe and Augustine Trebnik, Columbus, Ind., assignors to The Reliance Electric and Engineering Company, Cleveland, Ohio, a corporation of Ohio
Filed Aug. 28, 1968, Ser. No. 755,902
Int. Cl. B21d 53/28; B23p 15/14; B21h 5/00;
B29d 15/00; B21k 1/20
U.S. Cl. 29—159.2
19 Claims

ABSTRACT OF THE DISCLOSURE

The method of fabricating an improved composite gear which comprises the steps of arranging an inner ferrous metal annulus and an outer bronze annulus to define a concentric annular space therebetween, placing a solder member adjacent the annular space, heating the annuli and the solder member concurrently, while maintaining the recited relationship of the annuli, to cause molten metal from the solder member to flow into and fill the annular space, and then, while maintaining the recited relationship of the annuli, cooling the annuli to a temperature below the melting point of the solder member, thereby to join the annuli and to improve the wear characteristics of the bronze annulus. Gear teeth may be machined in the external surface of the bronze annulus either before or after the two annuli are so joined. The method of the present invention contemplates heating and cooling the bronze annulus in such a manner as to improve its wear or durability characteristics.

---

Figure 1:
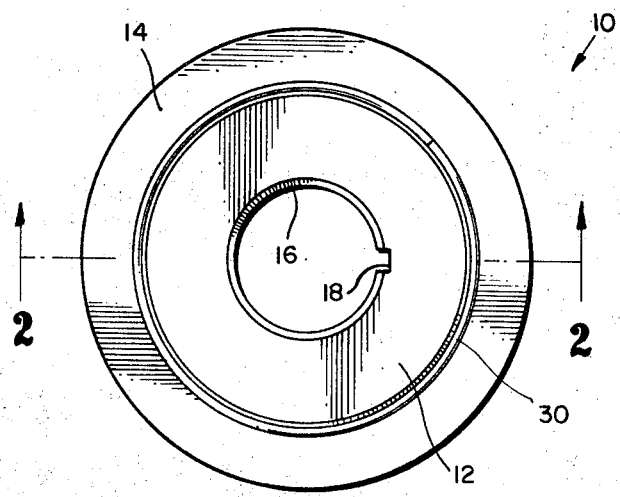

It is a primary object of our invention to provide a method for improving the wear or durability characteristics of bronze. A secondary object of our invention is to combine such a method with a method for joining a bronze gear ring to a steel hub. Particularly, we have provided a method for joining the bronze portion of the gear to the steel portion of the gear while, at the same time, heat treating the bronze to improve the wear or durability characteristics. Of course, as is conventional, the gear teeth are formed in the bronze portion of the gear, thereby to take advantage of the characteristic of bronze which permits it to mate with a ferrous metal.

Ordinarily, bronze is not heat treated and is merely used as cast, though certainly aluminum bronzes are heat treated to increase their tensile strength. We have discovered that the heating and subsequent cooling involved in our method for joining the bronze portion of a gear to the steel portion of a gear does significantly improve the wear characteristics of the bronze. Of course, by significantly improving the wear characteristics of the bronze portion, i.e., the portion in which the gear teeth are formed, we have provided a significantly improved gear.

To our knowledge, no one has used our method for fabricating a steel-bronze composite gear and, further, no one has used our preferred heating and cooling steps to heat treat bronze to improve its wear characteristics.

In the past, steel-bronze composite gears have been fabricated by casting a bronze annulus about the outer periphery of a steel annulus. This method is commonly referred to as chill casting. The chill cast bronze annulus is not fused to the outer periphery of the steel annulus and, therefore in some cases, it has been necessary to serrate or groove the outer periphery of the steel annulus so that the chill cast bronze annulus will remain in position on the steel annulus.

Steel-bronze composite gears have also been fabricated by welding the parts or by using screws or other fastening devices to hold the outer bronze annulus in position on the inner steel annulus.

Our method involves the use of an intermediae material to join the outer bronze annulus to the inner steel annulus. Such an intermediate material is commonly referred to as solder. We prefer to use a solder which, when heated to a point above its melting temperature and then cooled below such a point, will fuse to the bronze and steel annuli.

Our method may be used to join a bronze annulus to a cast iron hub to produce a composite iron-bronze gear. It is for this reason that, in the appended claims, we refer to the inner annulus as a "ferrous metal annulus."

It is an object of our invention, therefore, to provide a method of fabricating an improved composite gear which comprises the steps of arranging an inner ferrous metal and an outer bronze annulus to define a concentric annular space therebetween, placing a solder member adjacent the annular space, heating the annuli and the solder member concurrently, while maintaining the positional relationship of the annuli, to cause molten metal from the solder member to flow into and fill the annular space, and then, while still maintaining the positiona relationship of the annuli, cooling the annuli to a temperature below the melting point of the solder member, thereby to join the annuli and to improve the wear characteristics of the bronze annulus. Of course, the solder member must have a composition whose melting point is significantly lower than that of either annulus, i.e., lower than the melting point of the ferrous metal or of the bronze.

Another object of our invention is to provide such a method in which the annuli are heated to a temperature between 600° F. and 1600° F. (which causes the solder metal to flow) and then cooled in such a manner as to improve the wear characteristics of the bronze annulus.

Another object of our invention is to provide such a method in which the annuli are heated during the heating step to a temperature ranging from 1100° F. to 1260° F.

Another object of our invention is to provide such a method in which, after the annuli are heated to a temperature ranging from 1100° F. to 1260° F., the cooling step includes air cooling the annuli down to approximately 700–800° F. and then water quenching rapidly down to approximately room temperature.

Another object of our invention is to provide such a method in which the heating step includes placing the annuli and the solder member in a furnace held at approximately 1400° F. until the solder member melts and for a predetermined time thereafter, then removing the annuli from the furnace. We presently believe that such a predetermined time should be approximately 15 to 30 minutes when the heating is accomplished in a furnace, or approximately 15 seconds when the heating is accomplished in an induction brazing machine as described hereinafter.

Still another object of our invention is to provide such a method in which, after the annuli are removed from the furnace, the cooling step includes air cooling the annuli down to approximately 700–800° F. and then water quenching the annuli down to approximately room temperature.

Other objects and features of the present invention will become apparent as this description progresses.

To the accomplishment of the above and related objects, the method of the present invention may be practiced as described herein and as illustrated in the accompanying drawings, attention being called to the fact, however, that the description and drawings are illustrative only, and that changes may be made in the specific methods illustrated and described, so long as the scope of the appended claims is not violated.

Figure 2:
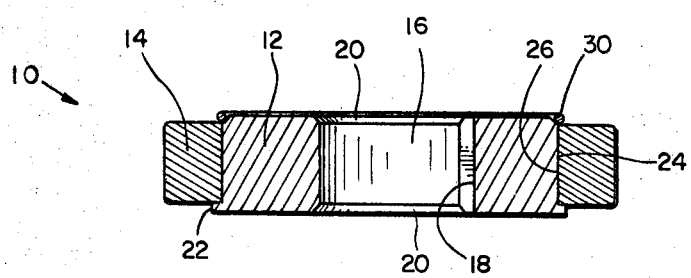

In the drawings:

FIG. 1 is an elevational view of a steel-bronze composite gear blank, i.e., a blank in which the gear teeth are subsequently formed, and showing the manner in which we place a solder ring relative to the bronze and steel annuli before they are heated; and FIG. 2 is a sectional view taken from FIG. 1 generally along the line 2—2.

Referring now to the drawings, it will be seen that we have illustrated a composite gear blank 10 comprising a steel annulus 12, hereinafter referred to as the hub 12, and a bronze annulus 14, hereinafter referred to as the ring 14. Gear teeth (not shown) may be formed in the ring 14 after it is joined to the hub 12 by our method which will be described hereinafter.

It will be appreciated that our method is particularly suited for fabrication of worm gears because the teeth of a worm gear are engaged frictionally by the thread of its associated worm. Thus, it is desirable to form the worm gear teeth in a bronze metal. We prefer to form the ring 14 from SAE-640 bronze, the composition of which is copper 85–88%, lead 1–1.5%, phosphorous 0.2–0.3%, zinc 0.5%, silicon 0.005%, nickel 0.75–1.5%, iron 0.3%, aluminum 0.005% and tin 10–12%. This bronze is hard, strong, tough, resistant to wear and easy to machine. We have found that it is convenient to obtain a continuously cast SAE-640 bronze sleeve and to slice the sleeve into sections to provide the rings 14.

The hub 12 is provided with a conventional center opening 16 and an axially extending keyway 18, the opening 16 being bevelled as indicated by the reference numeral 20 in FIG. 2. After the ring 14 is joined to the hub 12, the gear teeth may be formed in the ring in a conventional manner. We prefer to form the teeth after the joining operation in order to assure that the teeth will be formed concentrically with the opening 16. Methods of forming gear teeth are well known and need not be discussed, in detail, in this description.

We prefer to form the hub 12 with a radially outwardly and peripherally extending flange portion 22 against which the ring 14 abuts as shown in FIG. 2. This flange portion 22 positions the ring 14 axially relative to the hub 12. Further, we prefer to form the hub 12 and ring 14 so that the diameter of the outer periphery 24 of the hub is from approximately .001 to .005 inch less than the diameter of the inner periphery 26 of the ring. Thus, when the ring 14 and hub 12 are concentrically arranged as illustrated in FIGS. 1 and 2, there is a concentric annular space defined by the outer periphery 24 and the inner periphery 26 between the hub 12 and ring 14. Of course, this space between the outer periphery 24 and inner periphery 26 is very slight and, by a radial dimension, may be as small as .0005 inch. Nevertheless, it is into this space that we cause molten solder to flow, which solder, when it hardens, joins the bronze ring 14 to the hub 12. This space must be sufficient to permit the two parts to be assembled at room temperature, but should be as small as feasible, since a heavy layer of solder in the finished product would tend to weaken the composite gear.

It is necessary, of course, to use a fluxing agent on the outer periphery 24 and inner periphery 26 in order to get the solder to flow into and completely to fill the space defined by the said outer and inner peripheries. It is conventional to use flux in soldering operations and we use a commercially available flux and apply it in a conventional manner. For instance, we have used a high-temperature silver solder, which is sold commercially under the name Handy Harmon Easy Flow 45 and which melts at about 1100° F. With this silver solder, we use Handy Harmon Flux. When we use this solder and properly flux the outer and inner peripheries 24, 26, the solder is drawn into the space between the peripheries when the hub 12 and ring 14 are heated to about 1100° F.

The fit between the hub 12 and the ring 14, i.e., the .001 to .005 inch tolerance described above, is designed to minimize the amount of solder required to join the ring 14 to the hub 12, the amount of solder being minimized because of strength considerations as well as cost considerations. Further, the small space between the peripheries 24, 26 provides an action, which is analogous to a capillary action, which draws the solder generally uniformly to fill the space.

In order to position the solder in such a manner that it will be able to flow into and to fill uniformly the space between the peripheries 24, 26, we prefer to provide a solder ring which has a mean diameter approximately equal to the diameter of the outer periphery 24, the upper end of the hub 12 being bevelled as shown and the thickness of the ring being, for instance, ⅟₁₆ of an inch. We have shown such a ring 30 in FIG. 2. Referring to FIG. 2 it will be seen that the ring 30, the axis of which coincides with the axis of the hub 12, spans the upper adjacent edges of the outer and inner peripheries 24, 26. We place the hub 12, ring 14 and ring 30 in a heating means with the coinciding axes of the hub and ring generally vertical. In such a case, the outer peripheral surface 24 and the inner peripheral surface 26 extend generally vertically.

It will be appreciated that we can lay the hub 12 on a support means with the flange portion 22 down and then slip the ring 14 downwardly over the bevel of the hub to engage and be supported by the flange portion 22. Since, as illustrated in FIG. 2, the hub 12 is slightly thicker than the ring 14, the solder ring 30 can be placed about the upper peripheral edge of the hub to be held in registry with the space between the peripheries 24, 26. Thus, by using the structure illustrated in FIG. 2, we are not required to use any special jigs or fixtures to hold the hub 12, ring 14 and solder ring 30 in the proper positional relationship.

We have used successfully a low frequency induction heating unit to heat the hub 12, ring 14 and solder ring 30. The unit we have used is sold commercially under the trademark "Tocco." We simply place the hub 12, ring 14 and soldering 30 in the induction heating unit as discussed in conjunction with FIG. 2 and then heat the hub and rings until the solder melts and flows downwardly into the space between the peripheries 24, 26, and continue heating for a predetermined period, such as fifteen seconds, thereafter.

We have performed the heating operation in a muffle furnace which is held at a temperature of approximately 1400° F. When we use the muffle furnace at this temperature, the hub 12 and ring 14 are withdrawn from the furnace approximately fifteen to 30 minutes after the solder melts. Since the solder we prefer to use will begin to melt at approximately 1100° F., it will be appreciated that there is more than sufficient heat required to melt the solder and to cause the molten solder to flow into the space between the peripheries 24, 26. From this work with the muffle furnace, it appears to be practical to heat the hub 12, ring 14 and solder ring 30 in a high-volume, automatic gas furnace.

Because of the extremely effective and uninterrupted bond between the steel core and the bronze annulus which results from our process, we are able to minimize the radial thickness of the annulus of expensive bronze, thereby further reducing the cost of the finished composite gear. Whereas, in previous composite worm gear constructions known to us, the need for serrations at the interface, or for solid material to accommodate threading for set screws or the like, has required a very substantial thickness of bronze between the roots of the gear teeth and the inner surface of the annulus, we have found that we can achieve wholly satisfactory results when the radial thickness of the annulus exceeds the depth of the tooth by only a few thousandths of an inch, so that only a thin web of bronze spans the tooth roots.

Of course, the heating step of our method must involve temperatures which are less than the melting point of bronze which is approximately 1922° F. We believe that this is our only limitation and that we may heat the bronze ring 14 up to, for instance, 1600° F. and perhaps even to 1700 or 1800° F. Since our method involves one heating step to accomplish both a soldering function as well as a bronze heat treating function, it is necessary for us to optimize our controls to obtain satisfactory soldering as well as improved wear characteristics of the bronze. For instance, in some cases, we may find it desirable to use a low-temperature solder, such as a solder which will flow at approximately 600° F., to join the bronze ring 14 to the hub 12. Thus, our process contemplates the use of temperatures as low as 600° F. However, our work to date leads us to believe that our preferred heating range will be between 1100° F. and 1500° F. This range permits the use of high-temperature solder and, in addition, gives the desired improved wear characteristics.

We have found that it is desirable, after the above-described heating steps, to air cool the hub 12 and ring 14 down to approximately 700–800° F. and then to water quench the hub and ring down to approximately room temperature. However, we can omit the quench step and air cool the hub 12 and ring 14 down to room temperature and obtain, at least, comparable results as to durability of the bronze. It will be appreciated that the quenching step does speed up the process.

The durabiity or wearability of a transmission or bearing element is an extremely important and often critical factor. Elements formed from material which is more durable can, obviously, carry heavier loads for greater lengths of time than elements which are fabricated from less durable material. A material which is more durable will have a higher load-stress K factor than a material which is less durable. For a discussion of such factors, we refer to an article titled Wear Life of Rolling Surfaces starting at page 44 in the May 9, 1960 issue of Product Engineering and to Buckingham, Analytical Mechanics of Gears, 1963 Dover Edition, Chapter 23.

We have constructed in accordance with the present invention and tested steel-bronze composite rollers, i.e., a bronze ring soldered to a steel hub. In addition, as a comparison, we tested solid bronze rollers which had not been subjected to the heating and cooling involved in soldering the bronze ring to the steel hub. In these tests, we found that the steel-bronze composite rollers had experimental load-stress factors, as discussed in the above-referred article and book, more than twice that of the solid bronze, non-heat-treated rollers. We noted that the heating and cooling steps did not, significantly, change the hardness of the bronze. The following is a breakdown of the samples which were fabricated and tested in this effort:

SOLID BRONZE ROLLERS

Material: SAE–640 continuously cast bronze formed to provide a solid bronze roller, but not heat treated.
Hardness: 109–114 BHN
Load Factor: 607

FIRST STEEL-BRONZE COMPOSITE ROLLERS

Material: Steel hub with an SAE–640 bronze ring soldered thereto, the ring being sliced from a continuously cast bronze sleeve.
Process of fabrication: Each bronze ring was soldered to its steel hub by the induction heating process detailed at page 8, supra, air cooling the ring and hub to 800° F. and then water quenching.
Hardness: 102–107 BHN (After such heating and cooling.)
Load Factor: 1363

SECOND STEEL-BRONZE COMPOSITE ROLLERS

Material: Steel hub with an SAE–640 bronze ring soldered. thereto, the ring being sliced from a continuously cast bronze sleeve.
Process of fabrication: Each bronze ring was soldered to its steel hub by the muffle furnace process described at page 8, supra, air cooling the ring and hub to 800° F. and then water quenching.
Hardness: 99–102 BHN (After such heating and cooling.)
Load Factor: 1343

With the above-established results in mind, we then constructed (in accordance with the method of the present invention) and tested steel-bronze composite rollers and, for comparison purposes again, we fabricated and tested solid bronze rollers which were subjected to the heating and cooling steps involved in our method for joining bronze rings to steel hubs. The results of these tests indicated that the heating and cooling steps, such as those involved in our above-described soldering process, significantly improve the wearability of the bronze. Without undue elaboration, we can say that these tests have proved that, when SAE–640 bronze is heated and then subsequently cooled as discussed in conjunction with the description of our soldering processes, the load factor K is improved to the point where it is 2.77 times greater than the load factor K for conventional chill cast bronze which is not heat treated.

Further, we have tested steel-composite gears fabricated using our soldering methods. That is, we have life tested actual gear boxes comprising composite gears fabricated by our methods. These life tests of gear boxes have led us to believe that the durability or wearability tests made with the rollers and described previously are applicable directly to gear box testing.

What we claim is:

1. The method of fabricating an improved composite gear which comprises the steps of arranging an inner ferrous metal annulus and an outer bronze annulus to define a concentric annular space therebetween, placing a member, having a composition whose melting point is significantly lower than that of either of said annuli, adjacent said annular space, heating said annuli and said member concurrently, while maintaining the recited relationship of said annuli to cause molten material from said member to flow into and fill said annular space, and then, while maintaining the recited relationship of said annuli, cooling the annuli to a temperature below the melting point of the composition of said member, thereby to join said annuli and to improve the wear characteristics of said bronze annulus.

2. The method of claim 1 in which heating is accomplished by electrical induction and is continued for approximately 15 seconds after the melting point of said member is attained.

3. The method of claim 1 including the step of machining gear teeth in the outer periphery of said bronze annulus, the machining step being performed after the cooling step.

4. The method of claim 1 in which the annuli and said member are heated during the heating step to a temperature ranging from approximately 1100° F. to 1500° F.

5. The method of claim 4 in which the cooling step includes air cooling said annuli down to approximately 700° F. to 800° F. and then quenching rapidly down to approximately room temperature.

6. The method of claim 1 in which said heating step includes placing said annuli and said member in a furnace held at approximately 1400° F. until said member melts and for a predetermined time thereafter, then removing said annuli from the furnace.

7. The method of claim 6 in which said predetermined time is approximately 15 to 30 minutes.

8. The method of claim 6 in which said cooling step includes air cooling the annuli down to approximately 700° F. to 800° F. and then water quenching said annuli.

9. The method of claim 7 in which said cooling step includes air cooling the annuli down to approximately 700° F. to 800° F. and then water quenching said annuli.

10. The method of claim 1 in which said heating step includes placing said annuli and said member in an induction heating unit and energizing said unit to raise the temperature of such annuli and said member to a value above the melting point of said member but below the melting point of either of said annuli, continuing such energization for a further period of approximately 15 seconds and then removing the assembly from said unit.

11. The method of claim 1 in which the axes of said annuli are held generally vertically during the heating and cooling steps and in which said member is an annular member placed above and in spanning relation to said annular space, the axis of said annular member coinciding generally with said first named axis.

12. The method of claim 4 in which the axes of said annuli are held generally vertically during the heating and cooling steps and in which said member is an annular member placed above and in spanning relation to said annular space, the axis of said annular member coinciding generally with said first named axis.

13. The method of fabricating an improved composite gear which comprises the steps of arranging an inner ferrous metal annulus within an outer bronze annulus, the axes of said annuli coinciding and being disposed generally vertically and the diameter of the outer periphery of the inner annulus being from approximately .001 to .005 inch less than the diameter of the inner periphery of the outer annulus, placing an annular solder member, having a composition whose melting point is significantly lower than that of either of said inner and outer annuli, on and in contact with both of said annuli and in spanning relation to the upper edges of the said outer and inner peripheries, the axis of said annular solder member coinciding generally with the first-named axes, heating said annuli and said member concurrently, while maintaining the recited relationship of the annuli, to a temperature between 600° F. and 1600° F. to cause molten metal from said solder member to flow into the annular space between said annuli, and then, while maintaining the recited relationship of said annuli, cooling the annuli to a temperature below the melting point of the composition of the solder member, thereby to join the annuli and to improve the wear characteristics of said bronze member.

14. The method of claim 13 in which, during the heating step, said annuli and said solder member are heated approximately to 1400° F.

15. The method of claim 14 in which the cooling step includes air cooling said annuli.

16. The method of claim 14 in which the cooling step includes air cooling said annuli down to approximately 700° F. to 800° F. and then water quenching.

17. The method of claim 13 in which, during the heating step, said annuli and said solder member are heated to a temperature within the range from 1100° F. to 1260° F.

18. The method of claim 17 in which the cooling step includes air cooling said annuli.

19. The method of claim 17 in which the cooling step includes air cooling said annuli down to approximately 700° F. to 800° F. and then water quenching.

References Cited

UNITED STATES PATENTS

| | | | |
|---|---|---|---|
| 1,338,672 | 5/1920 | Calkins | 74—446 |
| 2,157,918 | 5/1939 | Rankin | 29—504X |
| 2,231,014 | 2/1941 | Lytle et al. | 29—498X |
| 2,645,006 | 7/1953 | Hadley | 29—504X |
| 2,709,375 | 5/1955 | Sandberg | 29—159.2X |
| 3,461,738 | 8/1969 | Pandjiris et al. | 29—159.2X |

JOHN F. CAMPBELL, Primary Examiner

V. A. DIPALMA, Assistant Examiner

U.S. Cl. X.R.

29—498, 504; 74—446; 148—13.2, 127